(12) United States Patent
Oates

(10) Patent No.: US 6,879,062 B2
(45) Date of Patent: Apr. 12, 2005

(54) ELECTRICAL SUBSTATION

(75) Inventor: Donald Colin Murray Oates, Brocton (GB)

(73) Assignee: Alstom, Paris (FR)

( * ) Notice: Subject to any disclaimer, the term of this patent is extended or adjusted under 35 U.S.C. 154(b) by 302 days.

(21) Appl. No.: 10/031,254
(22) PCT Filed: Mar. 19, 2001
(86) PCT No.: PCT/GB01/01182
§ 371 (c)(1),
(2), (4) Date: May 30, 2002
(87) PCT Pub. No.: WO01/71897
PCT Pub. Date: Sep. 27, 2001

(65) Prior Publication Data
US 2002/0176265 A1 Nov. 28, 2002

(30) Foreign Application Priority Data
Mar. 18, 2000 (GB) .............................................. 0006513
Mar. 18, 2000 (GB) .............................................. 0006514

(51) Int. Cl.[7] .............................................. H01H 3/26
(52) U.S. Cl. ...................... 307/140; 307/98; 307/106; 323/282; 363/65
(58) Field of Search .......................... 307/98, 106, 140; 323/282; 363/65

(56) References Cited

U.S. PATENT DOCUMENTS

| 3,842,339 | A |   | 10/1974 | Hoffman |
|---|---|---|---|---|
| 4,992,919 | A |   | 2/1991 | Lee et al. |
| 5,008,560 | A |   | 4/1991 | Kieren et al. |
| 5,018,058 | A |   | 5/1991 | Ionescu et al. |
| 5,109,185 | A |   | 4/1992 | Ball |
| 5,559,685 | A |   | 9/1996 | Lauw et al. |
| 5,654,679 | A | * | 8/1997 | Mavretic et al. ............ 333/17.3 |
| 5,895,979 | A |   | 4/1999 | Kojovic |
| 5,942,884 | A | * | 8/1999 | Soar et al. ................... 323/282 |
| 5,943,229 | A | * | 8/1999 | Sudhoff ....................... 363/125 |
| 6,014,322 | A | * | 1/2000 | Higashi et al. ............... 363/65 |
| 6,313,640 | B1 | * | 11/2001 | Nasrallah et al. ........... 324/536 |
| 6,404,655 | B1 | * | 6/2002 | Welches ....................... 363/41 |

FOREIGN PATENT DOCUMENTS

| DE | 299 10 979 U1 | 10/1999 |
|---|---|---|
| GB | 1042269 | 9/1968 |
| GB | 1153440 | 5/1969 |
| GB | 2 301 239 A | 11/1996 |
| GB | 2 320 109 A | 6/1998 |
| JP | 55008278 | 1/1980 |
| JP | 10042576 A | 2/1998 |
| JP | 11055954 | 2/1999 |

OTHER PUBLICATIONS

*A Novel Unity Poer Factor Low–EMI Uninterruptible Power Supply*, IEEE Transactions Onindustry Applications, vol. 34, No. 4, Jul./Aug. 1991, Michael Andrew de Rooij, et al., pp. 870–876.

* cited by examiner

Primary Examiner—Robert L. DeBeradinis
(74) Attorney, Agent, or Firm—Kirschstein, et al.

(57) ABSTRACT

A substation is disclosed for use in a power transmission and distribution network. The substation comprises a single phase isolating high frequency transformer having at least one input winding and at least one output winding with corresponding input and output solid state switching networks. Each input solid state switching network comprises a plurality of semiconductor switching devices which receive an input waveform from the transmission network and output a high frequency waveform to the primary winding of the transformer. Likewise, each output solid state switching network comprises a plurality of semiconductor switching devices receiving a high frequency waveform from the secondary winding of the transformer and outputting an output frequency waveform from the substation. A control circuit is adapted to control the operation of the switching devices of the input and output switching networks to generate the output waveform from the input waveform.

14 Claims, 3 Drawing Sheets

ELECTRICAL SUBSTATION

This invention relates to improvements in electrical substations, and in particular to a substation for use in power transmission and distribution systems.

Both heavy industry and domestic users consume increasingly large amounts of electricity. As the electricity is generated in central locations at power stations, there is thus a need for both transmission and distribution of electrical power over large distances.

Most electrical power transmission uses alternating AC voltages and currents due to the ease with which an alternating supply can be generated and then converted from one voltage level to another using transformers. DC transmission systems are also used in some cases especially where power is to be transmitted over very large distances. An example of such a DC system is the link between the United Kingdom and France which operates at around 500 k volts.

For efficiency, the voltages at which power is transmitted in an AC network are necessarily very high. For overhead power cables in the United Kingdom, transmission at 128 k volts, 160 k volts, 220 k volts and 280 k volts is common, but different countries use different voltages for administration and historical reasons. Generally transmission occurs at and 150 k volts or more, with distribution below 150 k volts. As this is considerably higher than the domestic voltage used, typically 400 volts at three phase, then it is necessary to convert the high voltage to a lower voltage when tapping off power from the transmission line.

Power is taken off the main transmission lines by sub-stations which fall into two main categories: transformer sub-stations and switching sub-stations.

The transformer sub-station's role is to convert between the very high voltages present on the transmission network and intermediate levels suitable for electricity generation and distribution to a specific area such as an industrial or housing development. For example, in the United Kingdom substations may typically be required to convert a 220 k volt input into a 60 k volt output suitable for an urban supply. They are typically located outside of urban areas and act as the first tap onto the network transmission.

The role of the switching substation is simply to direct power from one part of a distribution network to another. Typically this would be to take a tap from a ring distribution network. Switching sub-stations do not generally either step-up or step-down the voltage.

Of course, substations may serve other roles, such as the transmission and distribution of power to a railway network. In general, however, a common feature to all substations is that they receive an input at a first voltage and provide an output at a second voltage. The two voltages are usually different in magnitude, but could be of the same magnitude but different in phase due to transmission delays.

At present, because of the high power levels in transmission and distribution systems the use of AC power is most prevalent as it allows substations to be constructed around a simple transformer to convert voltages from one level to another. These are protected by circuit breakers so that the transformer can be isolated in the event of a fault and to allow repairs to be carried out. To ensure continuity of supply, two transformers are usually provided in parallel, each being connected to the network through circuit breakers so that one can be completely isolated whilst allowing power to be transmitted through the remaining transformer.

To fine tune the output voltage from the transformer one or more tap changers are typically provided. In use the output voltage is periodically monitored and the tap changer moved to add in or remove one or more turns of the transformer winding until the correct output voltage is obtained. Other than this, adjustment in situ is very limited.

As well as their limited flexibility a further disadvantage of transformer based substations is that they are extremely bulky and quite crude in their operation.

A problem specific to transmission networks employing overhead lines is that the amount of power which can be passed down the line will depend on the weather conditions as well as the condition of the line (for instance during maintenance). In hot weather the cables will expand and droop towards the ground. This reduces the power that can be passed down the line. Also, more power can be passed down the line on a windy day than on calm day as the wind helps to dissipate heat produced by the cables. Known substations based on passive transformers require additional circuits upstream to compensate for such changes if power flow along the lines is to be optimised.

For example, one device which can be used to optimise power flow comprises a VAR Compensator which introduces a variable reactance to the line to balance changes in line inductance. Again, this adds to the complexity and the cost of the system.

An object of the present invention is to provide a substation for use in a transmission and distribution network which overcomes, at least partially, some of the problems of known substations comprising passive transformers.

In accordance with a first aspect, the invention provides a substation for use in a power transmission and distribution network comprising:

a single phase isolating high frequency transformer having at least one input winding and at least one output winding;

an input solid state high frequency switching network comprising a plurality of semiconductor switching devices, the input switching network defining at least one input node for receiving an input power waveform from the transmission network and at least one output node connected to the primary winding of the transformer;

at least one output solid state high frequency switching network comprising a plurality of semiconductor switching devices, the output switching network being connected to the secondary winding of the transformer and defining at least one output node from which an output power waveform can be taken from the substation; and control means adapted to control the operation of the switching devices of the input and output switching networks to gestate the output waveform at the output node from the input waveform applied to the input node.

The invention thus replaces the known passive transformer substations with a semiconductor based system in which a control means operates suitable devices to produce an output waveform from an input waveform.

Note that "high frequency" in the context of the switching circuit and the transformers used in the present invention means high relative to normal supply frequencies such as 50 Hz e.g., frequencies of about 1 kHz and above.

The system is active in that the control of the switches is dependent upon the power condition in the input line as measured by the current and/or voltage applied to the input node.

Preferably, the substation is adapted to operate over input voltages greater than 150 k volts, or greater than 100 k volts or perhaps greater than 10 k volts.

The control means may include measurement means adapted to monitor the condition of the input voltage and modify or generate control signals for the switching devices dependent upon the measured value or values.

The use of such an active control system provides considerable advantages over the prior art. Firstly, it allows much greater control over the output voltage produced. In a passive transformer system, the output voltage waveform is fixed relative to the input by the turns ratio of the transformer. In the substation of the invention the output is no longer dependent in such a limiting way on the construction of the transformer. Indeed, a turns ratio of 1:1 could be used, the conversion being entirely dependent upon the operation of the switching devices.

The input switching device network may comprise a bridge circuit having at least one input node for each phase of the input supply. Typically, three input nodes are envisaged for a three phase distribution network. The input switching network may include a resonant element which forms a tank circuit, the switching circuit acting to maintain a flow of current in the tank circuit.

Preferably, the transformer comprises a single phase transformer. In a passive prior art system, the transformer must have a transformer phase for each input phase. Hence, for a three phase supply a three phase transformer would have been needed.

Where a single phase transformer is provided, the control means may be adapted to control the switching of the semiconductor switching devices so that a single substantially sinusoidal waveform is generated in the input side of the transformer whilst the semiconductor switching devices on the output side of the transformer are operated to reconstruct one or more output waveforms of different phase from the transformer output.

In a most preferred arrangement, the control means is adapted to control the semiconductor switching devices so as to produce at least one output voltage waveform which is independent of the input voltage waveform. Thus, a clean output waveform could be produced from a noisy input waveform. This cannot be achieved using a passive transformer substation which would faithfully reproduce the input noise in the output waveform.

The semiconductor switching devices may be arranged in relation to the transformer so that in the event of a failure of one or more switching devices or of the former or of the control means then power is not transmitted across the transformer. This acts as a fail safe arrangement. In one construction, a fail safe mode could be achieved by forcing all the switching devices to the same state, isolating the input waveform from the transformer.

The control means may be adapted to control the semiconductor switching devices, at least of the input switching network in such a way as to match the input impedance of the substation to the source impedance of the supply line. This maximizes power transfer from the supply line, and effectively eliminates the need for a separate VAR compensator which would be needed to achieve the same result with a passive transformer based system.

The source impedance may be controlled in real time by modifying the switching state of one or more of the semiconductor switching devices under the control of the control means. Means may be provided to monitor the input (source) impedance and the control means may be responsive to this.

The control means may be adapted to control the semiconductor switching devices to generate an output waveform that differs in phase from the input waveform. This could be adapted to gradually alter the phase of the output over time, for instance to match the output waveform to the demands of a load.

In another refinement a limiting means may be provided which is adapted to reduce the output voltage produced if the current drain exceeds a preferential maximum level. This can be used to temporarily allow the voltage to dip if an excess load current is drawn. The limiting means may comprise means adapted to monitor the output current drawn by the load and means adapted to modify the control signal applied to the semiconductor switching devices to reduce the output voltage if the current exceeds a threshold value.

The degree of sophistication of the system can be varied to provide various limiting controls. In one arrangement the control signals may be modified in response to a measure of the rate of change of current drawn. This can allow the system to mimic the action of a fuse.

The provision of the solid state substation can be used to provide several novel arrangements of distribution network.

Thus, in accordance with a second aspect, the invention provides a transmission and distribution network comprising a transmission line for the transmission of electrical power from a generator, a substation in accordance with the first aspect operatively connected to the transmission line, and one or more distribution lines connected to the output of the substation for onward supply of power to a load.

By load we may mean a direct load such as a motor or furnace, or perhaps another substation or part of another network.

The load may comprise a second transmission line adapted to transmit alternating voltage from a generator, and the substation may be adapted so that the control means controls the switching of the switching devices to generate an output waveform for supply to the second network which is in phase with the phase of the voltage on the second network. Thus, two out of phase or even different frequency networks can be readily supply connected together to share power.

At least two substations may be connected in parallel between the supply line and the output load. This allows one substation to be removed from the network for repair as well as allowing the network to continue to function in the event that one substation fails.

A circuit breaker may be provided upstream of the or each substation. This allows the substation to be isolated from the transmission line.

The network may comprise a consumer electrical transmission and distribution network. The transmission line may supply voltage at say 145 k volts or thereabouts, or perhaps 220 k volts or more than 220 k volts.

The load may operate at 36 k volts, or perhaps 20 k volts, or any value greater than either of these values.

Alternatively, the network may comprise a supply network for an electrical railway system.

There will now be described, by way of example only, embodiments of the present invention with reference to the accompanying drawings, in which.

Figure 1:
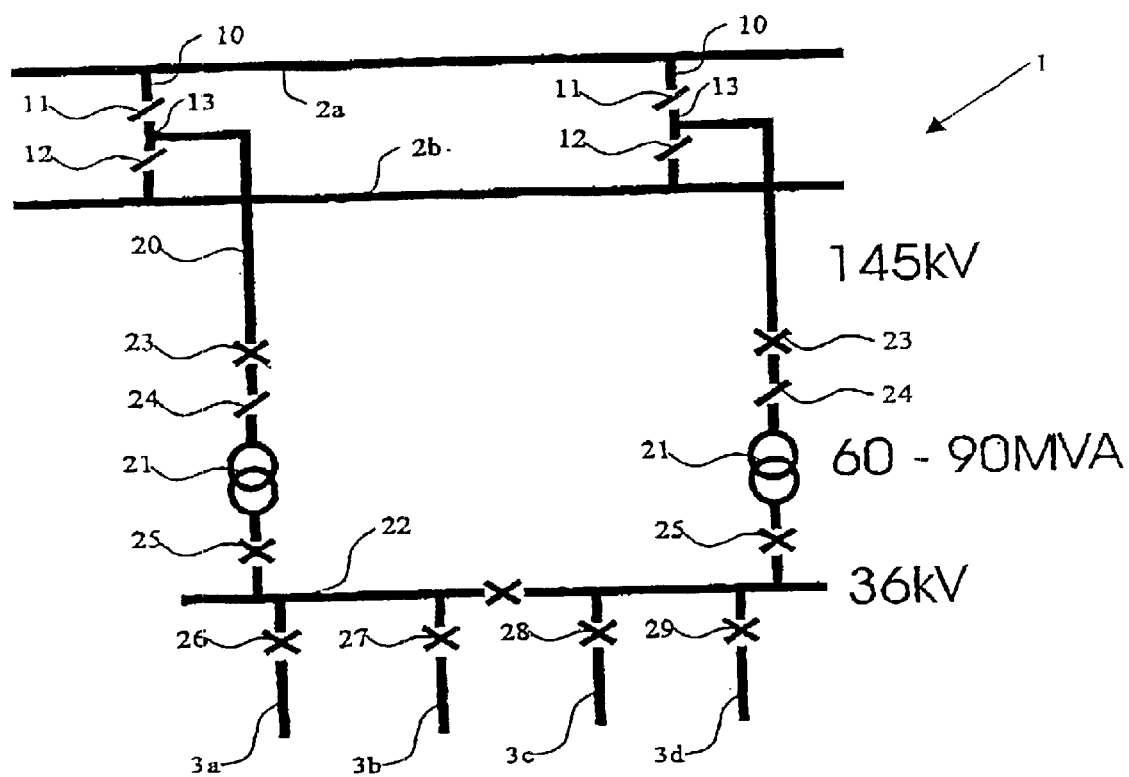
FIG. 1 is a schematic illustration of a prior art passive substation for use in a power transmission and distribution network.

The substation 1 illustrated in FIG. 1 of the accompanying drawings is connected between two three phase transmission lines 2a, 2b which carry 145 k volt waveforms and four three phase output lines 3a,3b,3c,3d at 36 k volts for onward distribution to a domestic supply network.

Looking at the left-hand side of FIG. 1, a spur line 10 connect the two input transmission lines 2a,2b together and includes two electrical isolators 11, 12 which are provided between a centre tap 13 of the spur line and a respective transmission line. The isolators 11, 12 can both be opened (i.e. made non-conducting) to completely isolate the centre tap 13 from both transmission lines. Alternatively, one isolator can be closed (i.e., conducting) to connect the tap to one or other of the transmission lines 2a,2b.

The centre tap 13 provides a take off point for a supply line 20 to an input side of a three phase transformer 21. The output of the transformer, which is again three phase, is connected through a spur 22 to the fur output lines 3a,3b, 3c,3d.

A circuit breaker 23 and an electrical isolator 24 are connected in series between the transformer 21 and the centre tap 13 so that it can be isolated from the supply lines for repair or replacement.

Another circuit breaker 25 is provided downstream of the transformer 21 to isolate it from the output lines 3a,3b,3c,3d. Of course, in normal use the circuit breakers are closed to allow current to flow in the transformer windings.

Finally, each of the output lines 3a,3b,3c,3d is connected to the transformer 21 through a respective circuit breaker 26,27,28,29 for extra protection.

The whole assembly of spurs, centre tap, transformer and circuit breakers/isolators is duplicated as shown on the right hand side of FIG. 1 to provide two parallel connected circuits. This is necessary to allow continuity of supply in the event that one of the transformers is shut down.

As shown, for a 145 k volt supply with each transformer stepping the voltage down to 36 k volts, the transformers typically need to be able to handle 60–90 MVA (i.e. Megawatts) of power. They are therefore extremely bulky.

Figure 2:
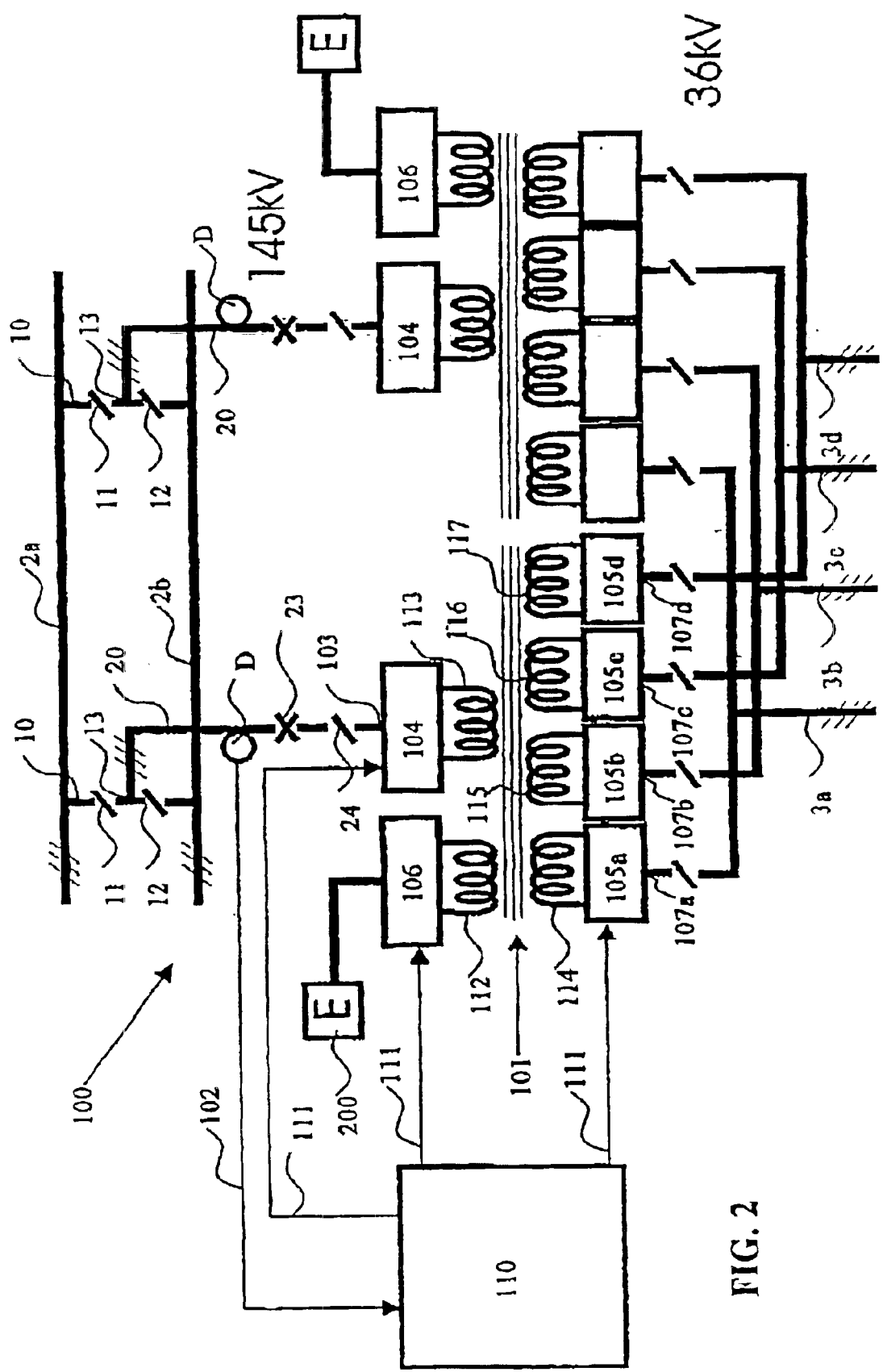
FIG. 2 is a schematic illustration of a substation in accordance with the invention for use in a supply network.

An alternative substation, which is intended to replace that shown in FIG. 1, can be constructed in accordance with the principles of the present invention. Such a substation 100 is illustrated in FIG. 2 of the accompanying drawings. Note that connections carrying three-phase current are indicated by three thin parallel hatching lines.

The basic layout of the substation of FIG. 2 is the same as for FIG. 1 in so far as it includes two identical (left and right) transformer circuits. The main difference is that instead of a passive system employing a three phase step-down transformer, each transformer circuit now includes a single phase transformer 101 with associated high frequency switching circuitry, e.g., frequencies of about 1 kHz and above. Only the left-hand half of the circuitry will be described hereinafter for clarity. Where possible, identical reference numerals to those used in FIG. 1 will be employed.

The single phase transformer 101 has two input or primary windings 112, 113, connected respectively to input switching circuits 106, 104, and four output or secondary windings 114,115,116,117, connected respectively to output switching circuits 105a to 105d, which in turn are connected to the output load lines 3a,3b,3c,3d. Several secondary windings associated output switching circuits are utilised for reasons of increased reliability of the substation and enhanced flexibility of power supply management to the load(s). A supply line 20 to the transformer 101. from the transmission lines 2a,2b is connected to an input node 103 of input switching circuit 104. In practice, three input nodes 103 to switching circuit 104 are required for a three phase transmission line. In use, the input or primary windings 112 or 113 of transformer 101 are driven by the input switching circuits 106 or 104 which are controlled to produce the appropriate waveform in their associated winding. This waveform is then replicated in the output or secondary windings 114–117 and the output switching circuits 105a to 105d are controlled to produce a desired output waveform at their output nodes 107.

The input and output switching circuits 104, 105 and 106 each comprise a network of semiconductor switching devices, such as IGBT'S, connected to form a bridge.

Figure 3:
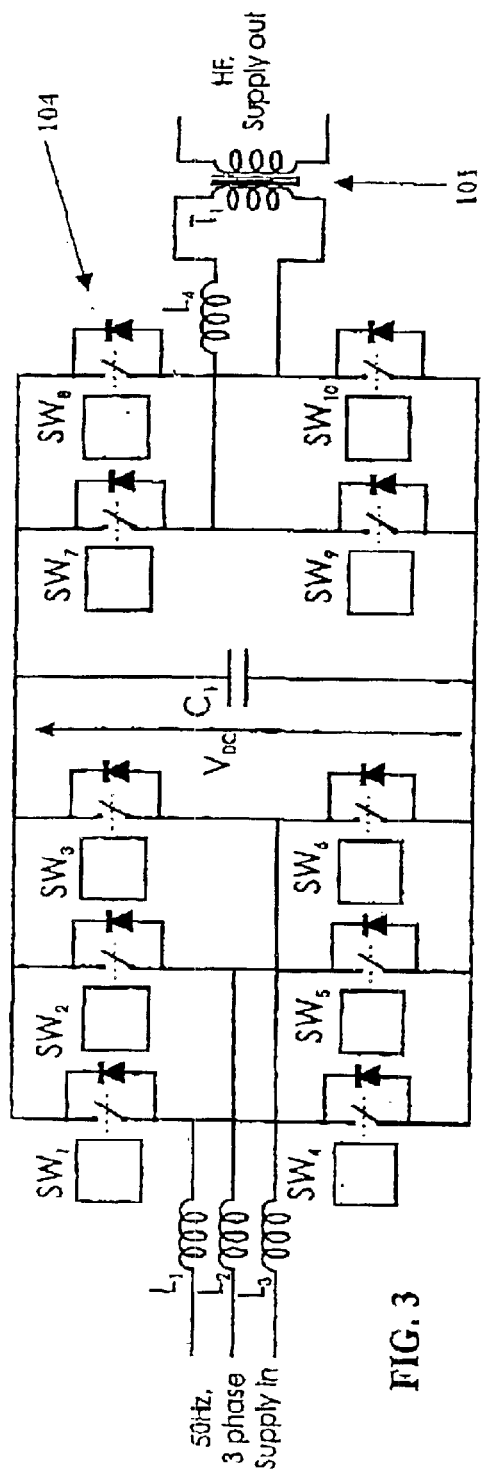
FIG. 3 is a schematic illustration of one way of implementing the converters 104 in FIG. 2.

FIG. 3 illustrates an example of a suitable switching network for the input switching circuit 104. It comprises a power converter in which semiconductor switches SW1 to SW6 form a reversible rectifier to allow bi-directional power to flow between the DC link voltage ($V_{DC}$) and the three phase 50 Hz AC waveform. The operation of the switches is such that a variable mark:space square wave is generated using conventional high frequency pulse width modulation (PWM) techniques, with the voltage levels defined by the DC link voltage. The average of this defines a voltage that is applied to one end of the AC filter inductor (L1–L3). Since the rectifier circuit is only referenced to the supply the average of the three voltages produced by the PWM action has to equal the average of the three phase supply. The voltages produced by the PWM action will be a three phase 50 Hz sine wave of equal frequency and variable magnitude and phase relative to the AC supply, which are controlled to define the magnitude and phase of the current in the inductors. Controlling whether the PWM generated voltage leads or lags the supply voltage controls whether power is passed to the supply or drawn from it respectively. Similarly, the magnitude of the PWM generated voltage relative to the supply voltage determines the degree of power factor correction that is applied. The control of such converters is standard practice and for a more detailed study of how this can be carried out, reference can be made to papers such as: Schauder, Mehta, "Vector analysis and control of advanced static VAR compensators", IEE Proceedings Part C, Vol 140, No 4, July 1993; and Barras Cade, "PWM rectifier using indirect voltage sensing", IEE Proceedings, Power Applications, Vol 146, No 5, September 1999. The value of the filter capacitor, C1, must be such as to minimise 100 Hz voltage harmonic components in the DC link voltage arising from out of balance voltages is the AC supply voltage.

Semiconductor switches SW7 to SW10 form a full, four-quadrant bridge circuit that will allow bi-directional power flow across the high frequency transformer. To source power into the high frequency transformer in parallel with other sources (when they are present) requires that some reactance is present in series with the transformer. The transformer has a degree of self-inductance that may be sufficient so a separate component may not be required. The two pairs of switches $SW_7$–$SW_{10}$ each use high frequency PWM to generate a square wave, displaced in time. The degree of displacement between the two square waves defines the magnitude of the waveform to be applied to the transformer. Where there are several power sources applying power to the transformer, the flow of power is determined by the voltage applied to the series inductance $L_4$, defined by the phase relationship between the transformer voltage and the voltage derived by the bridge switching. This operation is similar to that described in Kheraluwala, Gascoigne, Divan, Bauzmann, "Performance characterisation of a high-power dual active bridge DC-to-DC converter". Transactions on Industry Applications, Vol. 28, No 6, November/December 1992, to which the reader is directed for details. In this reference, converters are placed across opposite sides of a transformer and phase delay between the converters is used to improve the operation of the switching. Other forms of power converter that may be used in the present invention are given in Pressman "Switching Power Supply Design", McGraw Hill, ISBN 0-07-052236-7, 1998.

Alternatively, and preferably, the switching circuit 104 can be a resonant matrix converter, as shown and described with reference to FIG. 2 of our co-pending International patent application claiming priority from British patent application number GB0006513.6, filed 18$^{th}$ Mar. 2000. The example given therein is for a motor power supply, but the principle is equally applicable to the present case.

Referring a to FIG. 2 of the present application, the three phase output on lines 3a to 3d is reconstructed from the single phase transformer waveform using pulse width modulation to control solid state switching networks in the output switching circuits 105a to 105d so as to "reconstruct" a waveform of the desired phase and frequency. Each output switching circuit 105 may be a mirror image of input switching circuit 104, and so need not be further described, except that it will have different voltage and current ratings, as appropriate. Known smoothing circuitry is also provided to refine the shape of the output waveforms.

As indicate at E in FIG. 2, it is proposed in this embodiment of the invention to provide a means of back-up DC energy storage or supply. The most common and reliable forms of DC energy storage used in power electronics are either base on capacitors for small and medium amounts of energy or batteries for large amounts of energy. However, fuel cells could also be used as a backup supply. It is convenient to operate such a back-up energy system through the primary winding 112 of the single phase transformer 101 and it will be necessary to regulate the current inflow and outflow from the storage device E; hence, it is interfaced to the transformer through a switching circuit 106 comprising a DC to AC high frequency inverter, for example, as shown and described with reference to FIG. 1 of our co-pending International patent application claiming priority from British patent application number GB0006513.6, filed 18$^{th}$ Mar. 2000.

Figure 4:
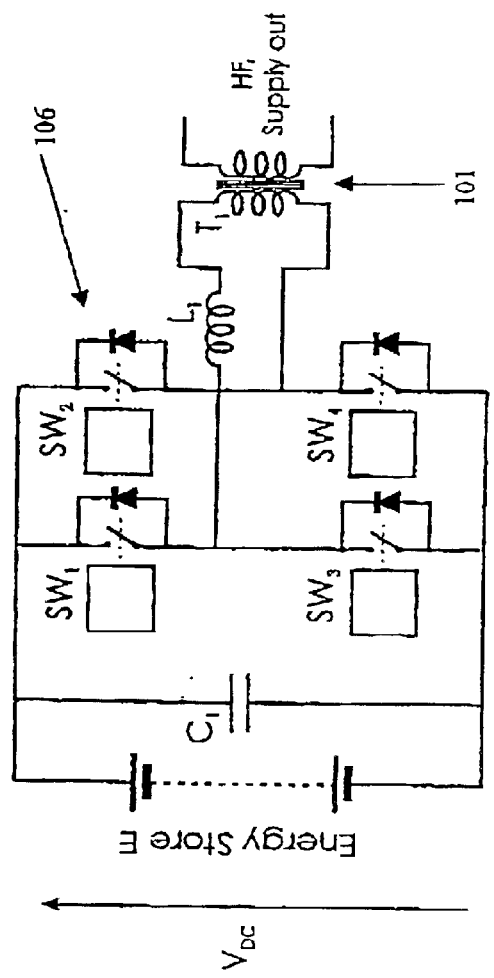
FIG. 4 is a schematic illustration of one way of implementing the inverters 106 in FIG. 2.

Alternatively, input switching circuit 106 may be implemented as shown in FIG. 4, which shows a conventional full, four-quadrant bridge circuit being used to allow bi-directional power flow between the transformer and the energy store E, shown in the figure as a battery. This circuit will not be further described because it is operated in an identical manner to the full four-quadrant bridge circuit shown and described with reference to FIG. 3.

Returning to FIG. 2, the semiconductor switches in the input and output switching circuits 104, 105, 106 are controlled by control signals on control lines 111 generated from a control unit 110. This unit comprises a central processing unit which generates control signals. The processing unit constructs appropriate control signal dependant upon instructions from a suitable control program and the condition of the power supply in lines 2a and 2b, as represented by signals on line 102 from a measurement device D which measures the current and voltage flowing along the input line 20 to the input switching circuit 104. For example, device D may comprise voltage and current transformers, which are well known in themselves.

The control program for controller 110 may use known PWM techniques, such as natural sampling of sliding mode control, to regulate the current and/or voltage in the output lines 3a–3d so as to assist network power stability in cases where there are other power sources feeding into the same local power network as the transformer 101. It should be noted that synchronous machines used for power generation inherently operate in synchronism with other generation sources. For any phase disturbance to the machine or the power system to which it is connected there is a strong force to restore the state of equilibrium, resisted by the inertia of the machine. As power networks become large and complex the nature of this restoring force can be compromised due to the manner in which the different generators and loads interact. For the present invention, the restoring force and inertia are absent and phase lock is controlled electronically, so it will not adversely affect the dynamic stability of the power transmission or distribution system to which it is connected.

As an example of use of the energy store E, suppose—as sometimes happens—there is a short break (of up to say one half cycle) in the supply voltage waveform on lines 2a and 2b. When this occurs, it will be signaled to the controller 110 by the measurement device D and the input switching device 104 can be switched by appropriate control signals so as not to generate a waveform in the associated primary winding 113, the input switching device 106 also being switched at the same time to provide a short burst of power from store E—this being a capacitor bank—to fill in the missing part of the cycle. When normal operation is resumed this capacitor bank can be recharged by reverse operation of the switching device 106 using energy taken from the supply lines 2a, 2b via line 20 and primary winding 113.

By providing input and output solid state high frequency switching circuits in combination with a single phase high frequency transformer, considerable operational benefits are achieved. Some of the advantageous features are set out below.

(1) Matched Sink Impedance Control

The input impedance of a converter circuit such as input switching circuit 104 is a measure of how the input current drawn by the converter compares with the voltage applied to the converter. As previously mentioned, the 3 phase voltages and currents may each be represented by a technique known as "Sliding mode control", in which the magnitudes of each of the three phases are mapped into single rotating vectors in two-dimensional space. It should be noted that a third number is generated, which for a balanced 3-phase system should be zero. If the vectors for the voltage and current overlay each other, the input impedance is resistive, if the current is in advance of the voltage then the input impedance may be regarded as a parallel RC (resistance-capacitance) network. There will be a natural tendency for the current to lag the voltage due to the inductance of the transmission system. This will reduce the voltage at the converter and so a direct method of defining the current relationship to the source voltage to compensate for this can reduce transmission losses. This can be readily achieved by the present invention by selecting appropriate control signals for the switching devices.

Considering the circuit shown in FIG. 2 of our previously mentioned copending application, in which the switching devices are connected in a bridge, the requirement is to control the switching of the bridge circuits so as to regulate the currents in the input inductances in a defined manner. Considering a 3-phase AC system, with a three arm bridge, there are eight permitted combinations of switching for the devices for each half cycle of the inverter. The switching state may be changed as zero voltage is reached on each half cycle of the resonant circuit both to maintain the resonant operation of the "tank circuit" and to regulate the current in the inductors (note that the tank circuit is the resonant LC network across the output of the resonant matrix converter shown in FIG. 2 of our previously mentioned copending application). If it is assumed the input voltage $V_s$ varies very little over a half cycle period then the change in inductor current will ideally be given as:

$$Ai = \frac{1}{Ls}\int_0^\pi (V_s - V\sin\phi) d\phi$$

where V is either $+V_T$ or $-V_T$, the peak tank circuit voltage, depending on the switch state. Mapping the change in currents for eight combinations of the switch states into the vector space gives six values as a hexagon with the two states representing all high or all low in the centre of the hexagon. The orientation of the hexagon relates to the position of the vector of the voltage in space and the magnitude of the hexagon relates to the magnitude of the input inductor $L_g$. This may be chosen so that on selecting any particular switch state the resulting change in current is sufficient to track a reference current value with minimum error. Too large a value and the possible change in current will not be sufficient to follow the reference, too low a value and the change in current at each step will be excessive, casing a high level of current ripple on the input.

(2) Fail Safe Power Protection

The advantage of the use of high frequency transformer isolation is that, as the intermediate frequency rises the transient energy that can be transmitted between primary and secondary reduces. Thus, by stopping the primary converter circuit 104 from switching, negligible energy can then be passed from primary to secondary windings in transformer 101 and so a fail safe circuit-breaker action is provided. With known circuit-breaker systems an action must initiate the breaking of current and so there is always doubt as to whether the breaker will operate correctly. With the present invention, the breaking of current is performed by presenting an action, this being inherently more reliable than initiating an action. Furthermore, it can be made "failsafe", i.e. the absence of any of a group of selected signals can inhibit the converter operation with absolute certainty.

The modes of system protection can be divided into those where damage may be caused to the substation system and those where damage may be caused to the system it is feeding. Because power transmission must have a high reliability the power feed is divided into the various sub-circuits on the secondary side of the transformer 101. The output switching circuits 105a–105d would normally control the flow of power, the use of the input switching circuit 104 to break power flow being only for catastrophic faults which would normally only occur within the converter system itself.

The manner in which the converters operate means that they should be rated to withstand the maximum current that will be present in the circuit they are supplying. This will be at a level very much higher than the rated current of the system which is based on R.M.S. current loading. The loads are all transformer coupled and when a transformer is first switched on it momentarily sees an unbalanced supply and may saturate causing a high transient unidirectional current to flow. This will normally settle within a few cycles and it is important that the supply protection function built into controller 110 is able to discriminate between this occurrence and a fault current. The function $\int i^2 dt$ rising above a petted level is usually applied to distinguish between a transient overload and a fault current, where "i" is the current drawn from the load. Thus the following protection modes can be provided:

1. If currents drawn from the output switching circuits 105a–105d on the secondary side of the transformer 101 are above the maximum rating of the input etching circuits 104, 106 on the primary side of the transformer, the controller 110 may cause the input switching circuits to inhibit, preventing further power transfer to the secondary side.
2. If currents from the load are above the rating of the output switching circuits 104a–105d or at a level set to be less than that for the input switching circuit 104, the controller 110 may cause the output voltage to reduce to maintain the current to within the maximum level. If this is maintained for an excessive time (e.g. >100 ms) that output switching circuit must inhibit.
3. If the result of the function $\int i^2 dt$, where "i" is the current drawn from the load, rises above a permitted level then the output switching circuits 105a–105d must inhibit. The level can be set to represent the current level for the R.M.S. rating of the load system and must be high enough that standard short term transients do not cause the system to trip.

It will be appreciated that the above described embodiments are not intended to be limiting and that other embodiments of the invention are envisaged.

What is claimed is:

1. A substation of a long distance, megawatt power transmission and distribution network, comprising:
   a) a single phase isolating high frequency high kilovolt transformer having at least one input primary winding coupled through a circuit breaker to a long distance, megawatt power distribution line and at least one output secondary winding;
   b) an input solid state high frequency high kilovolt switching network comprising a plurality of semiconductor switching devices, the input switching network defining at least one input node for receiving an input power waveform from the transmission network and at least one output node connected to the at least one primary winding of the transformer;
   c) at least one output solid state high frequency high kilovolt switching network comprising a plurality of semiconductor switching devices, the output switching network being connected to the at least one secondary winding of the transformer and defining at least one output node from which an output power waveform is taken from the substation; and
   d) control means for controlling the switching devices of the input and output switching networks to generate the output power waveform at the at least one output node from the input power waveform applied to the at least one input node.

2. The substation according to claim 1, in which the control means is operative for controlling the semiconductor switching devices in dependence upon current and/or voltage applied to the input switching network.

3. The substation according to claim 1, in which the control means is connected to receive power condition signals from measurement means located to sense power flowing to the at least one input node, the control means being operative for outputting signals to the input and output solid state switching networks thereby to control switching of the semiconductor switching devices therein in response to variations to the power condition signals.

4. The substation according to claim 1, in which the input switching network comprises a bridge circuit having at least one input node for each phase of an input supply.

5. The substation according to claim 4, in which the control means is operative for controlling the semiconductor switching devices in the input switching network so that a single substantially sinusoidal waveform is generated in the at least one primary winding of the transformer, and for controlling the semiconductor switching devices in the output switching network to reconstruct output power waveforms of different phase from the output power waveform in the secondary winding of the transformer.

6. The substation according to claim 1, in which the control means is operative for controlling the semiconductor switching devices so as to produce at least one output voltage waveform which is independent of an input voltage waveform.

7. The substation according to claim 1, in which the semiconductor switching devices are arranged in relation to the transformer so that, in the event of a failure of at least one of the semiconductor switching devices and the transformer and the control means, then power is not transmitted across the transformer.

8. The substation according to claim 1, in which the control means is operative for controlling the semiconductor switching devices of at least the input switching network, in such a way as to match an input impedance of the substation to a source impedance of a supply line.

9. The substation according to claim 8, in which the control means is operative for modifying a switching state of at least one of the switching devices thereby to control the source impedance in real time.

10. The substation according to claim 1, and further comprising a limiting means for reducing a maximum output voltage produced in the event that a current drain exceeds a preset level.

11. A long distance, megawatt power transmission and distribution network, comprising:
   a) a long distance, megawatt power transmission line for the transmission of electrical power from a generator;
   b) a substation comprising:
      i) a single phase isolating high frequency high kilovolt transformer having at least one input primary winding coupled through a circuit breaker to the long distance, megawatt power transmission line and at least one output secondary winding,
      ii) an input solid state high frequency high kilovolt switching network comprising a plurality of semiconductor switching devices, the input switching network defining at least one input node for receiving an input power waveform from the transmission network and at least one output node connected to the at least one primary winding of the transformer,
      iii) at least one output solid state high frequency high kilovolt switching network comprising a plurality of semiconductor switching devices, the output switching network being connected to the at least one secondary winding of the transformer and defining at least one output node from which an output power waveform is taken from the substation,
      iv) control means for controlling the switching devices of the input and output switching networks to generate the output power waveform at the at least one output node from the input power waveform applied to the at least one input node,
      v) the substation being operatively connected to the transmission line; and
   c) at least one distribution line connected to an output of the substation for onward supply of power to a load.

12. The network according to claim 11, in which the load comprises a second transmission line for transmitting alternating voltage from the generator, and in which the control means is operative for controlling the switching devices to generate the output power waveform for supply to a second network which is in phase with a phase of a voltage on the second network.

13. The network according to claim 11, in which the substation comprises two transformers and associated input and output switching networks connected in parallel between a supply line and the output load.

14. The network according to claim 11, in which a first isolator is provided upstream of the substation in addition to the circuit breaker, and in which a second isolator is provided downstream of the substation.

* * * * *